April 22, 1924.
J. H. HAMMOND, JR
1,491,775
METHOD OF AND SYSTEM FOR TRANSMITTING AND RECEIVING ELECTRORADIANT ENERGY
Original Filed Sept. 28, 1916    9 Sheets-Sheet 8
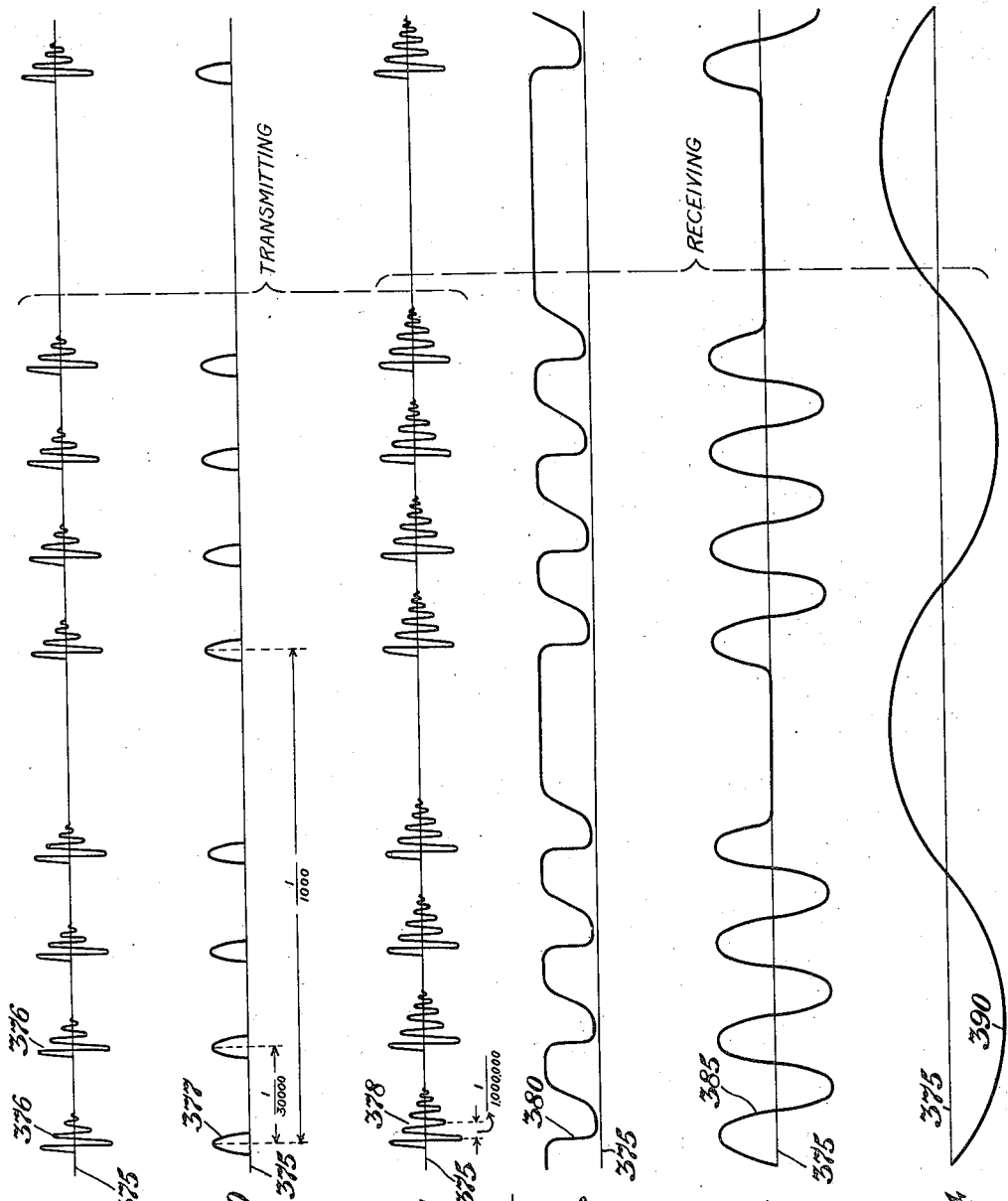
WITNESS
Chas. J. Clagett
INVENTOR
John Hays Hammond Jr.
BY
A. J. Gardner
HIS ATTORNEY

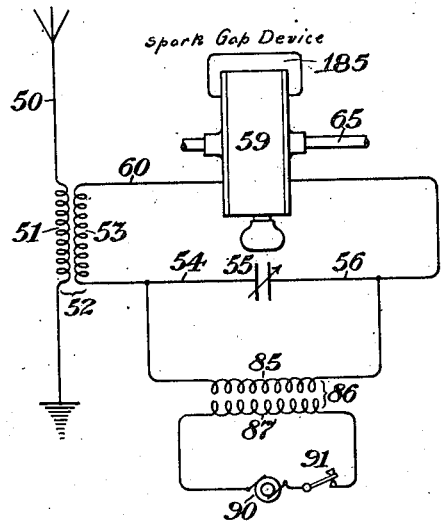
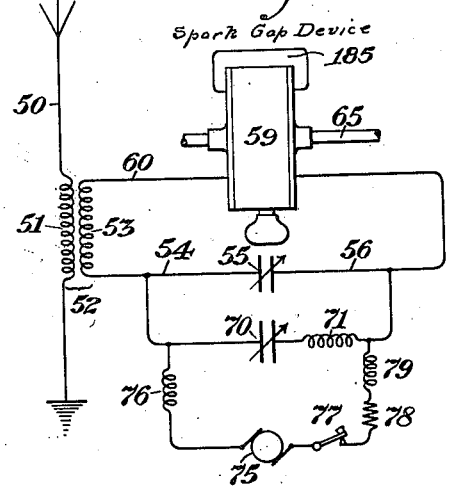

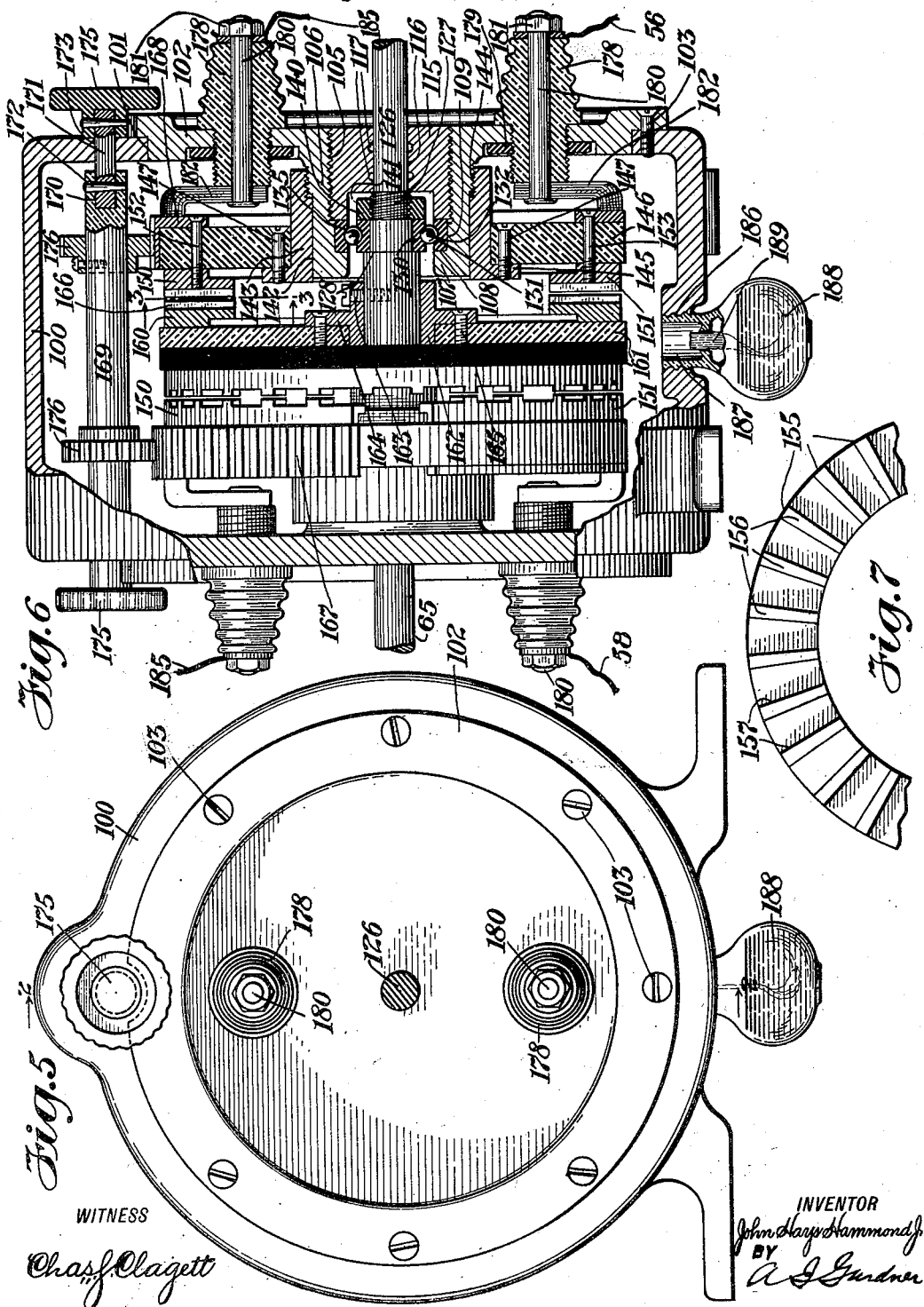

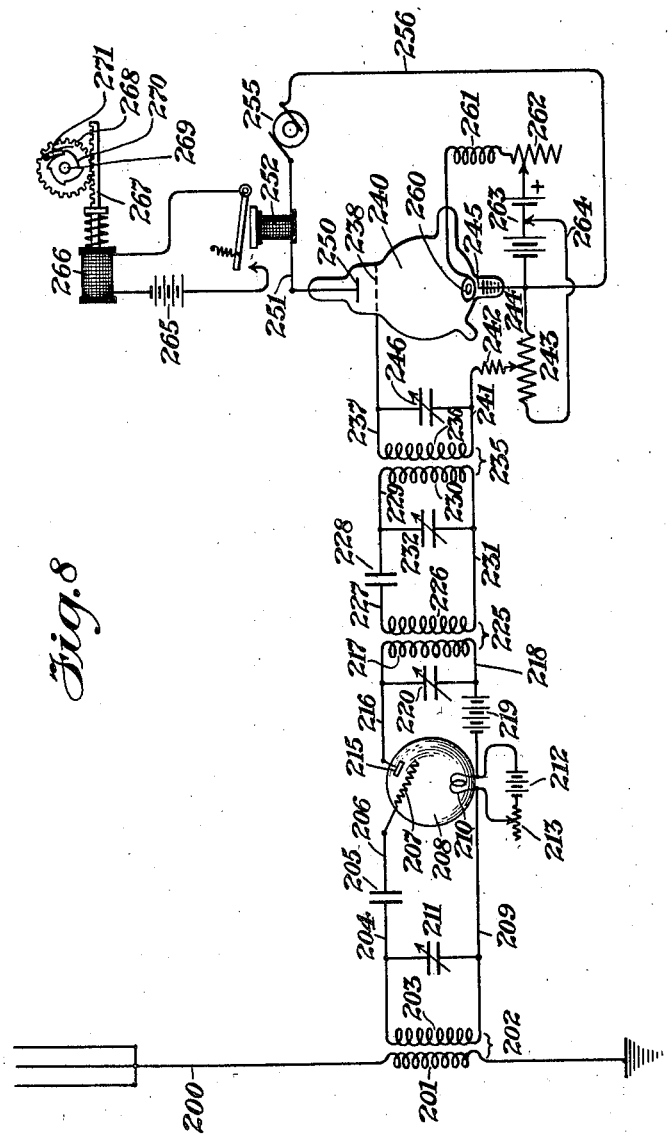

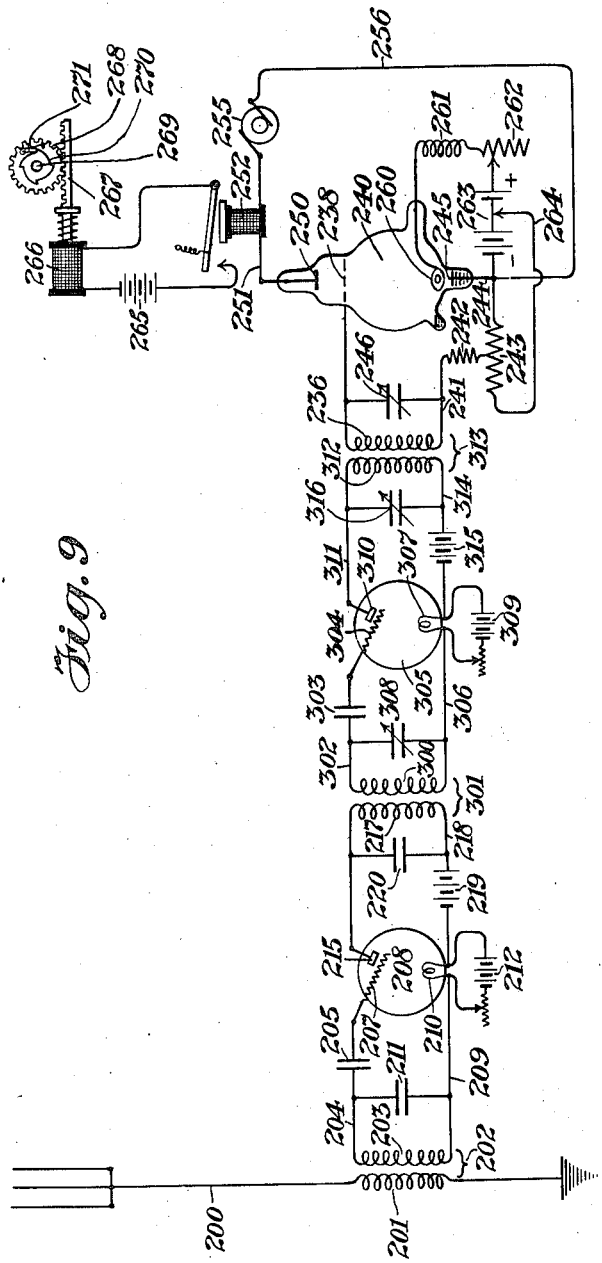

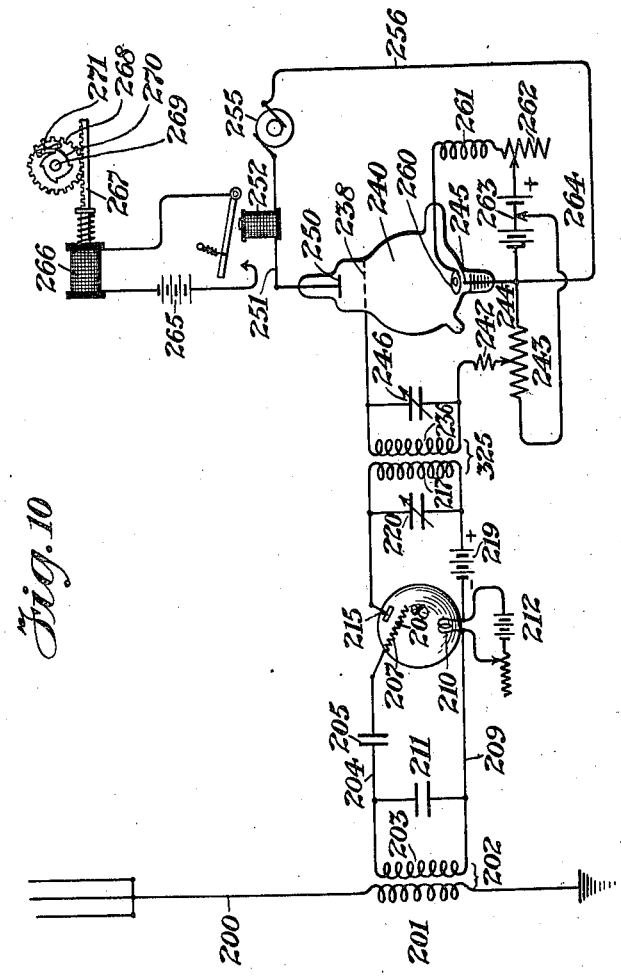

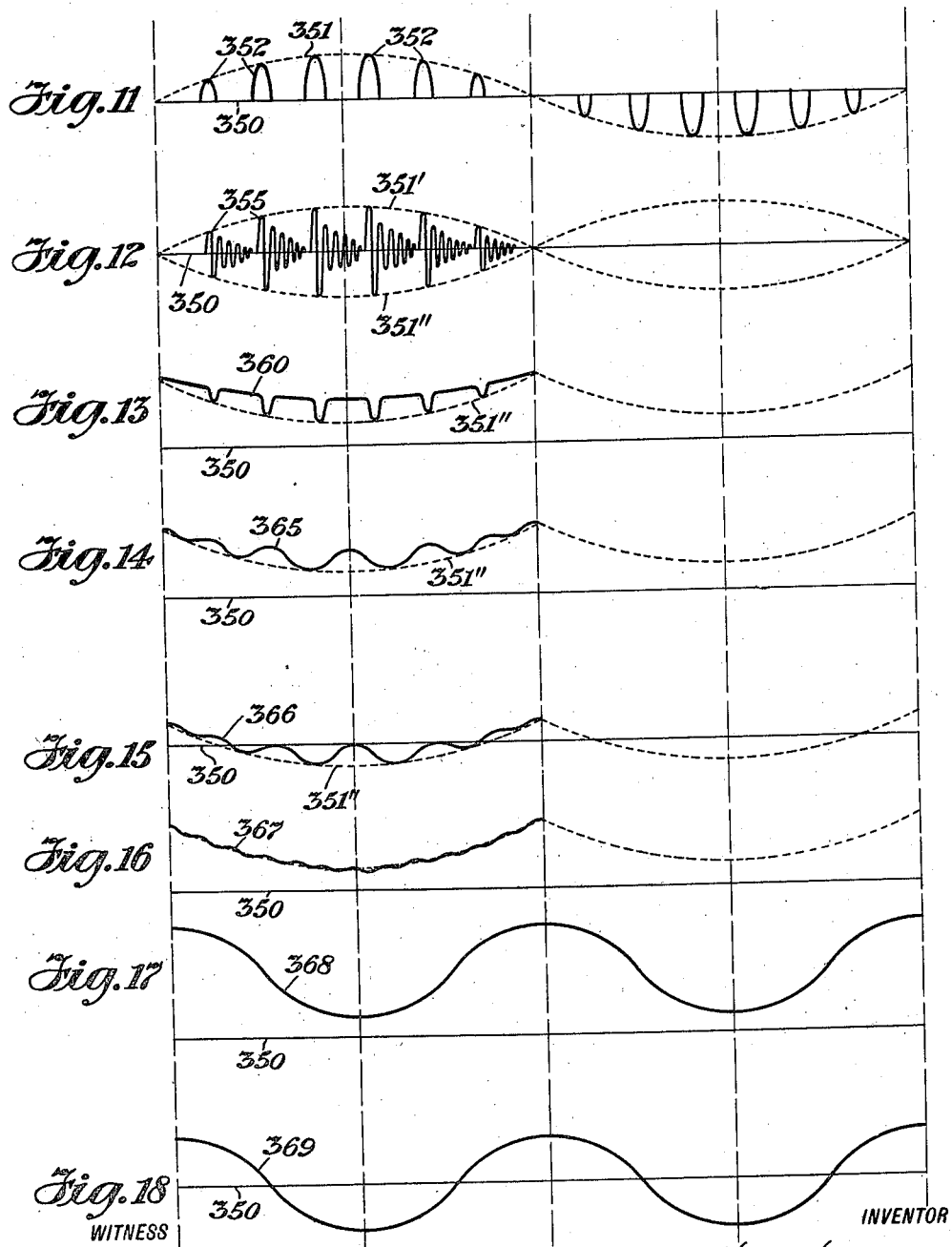

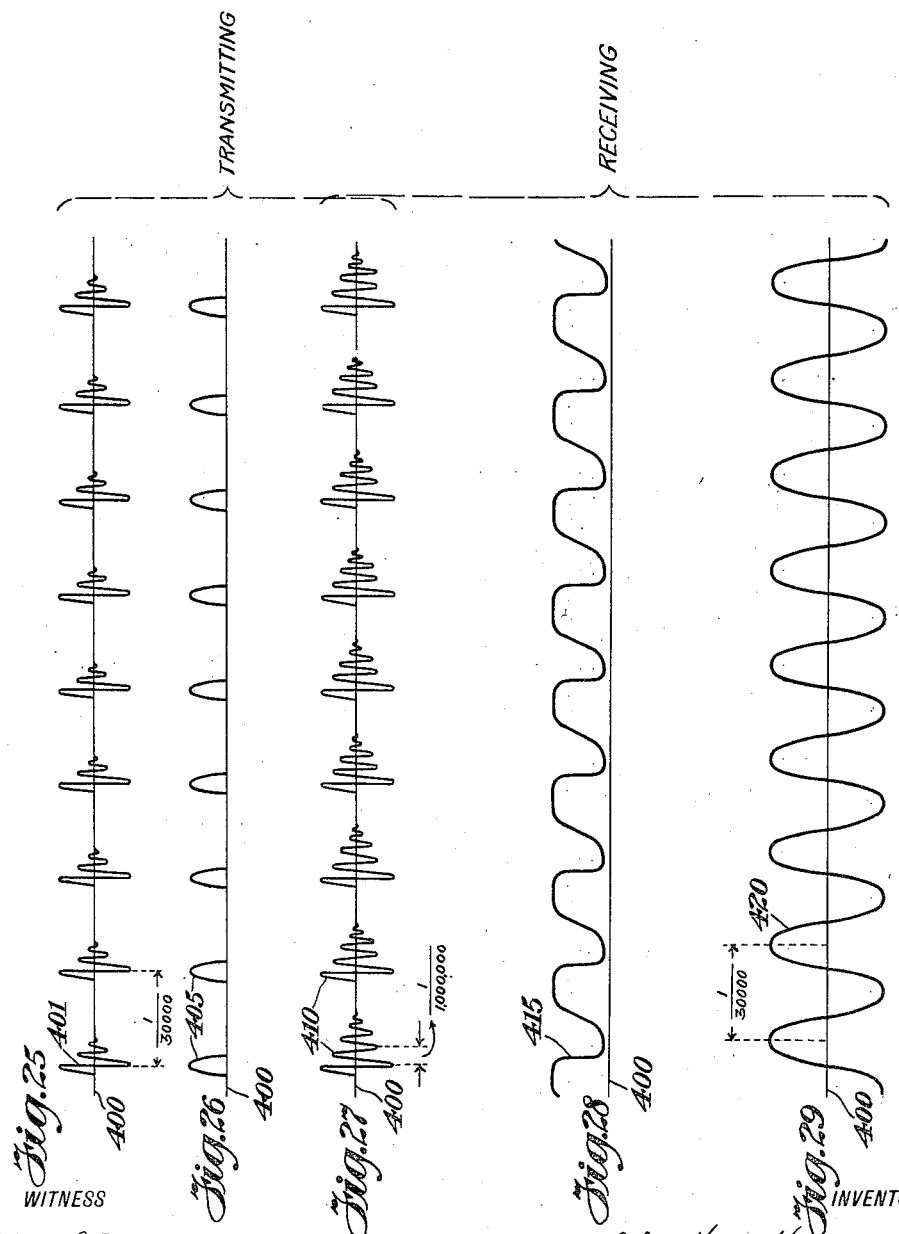

Patented Apr. 22, 1924.

1,491,775

UNITED STATES PATENT OFFICE.

JOHN HAYS HAMMOND, JR., OF GLOUCESTER, MASSACHUSETTS.

METHOD OF AND SYSTEM FOR TRANSMITTING AND RECEIVING ELECTRORADIANT ENERGY.

Application filed September 28, 1916, Serial No. 122,666. Renewed November 8, 1923.

*To all whom it may concern:*

Be it known that I, JOHN HAYS HAMMOND, Jr., a citizen of the United States, and a resident of Gloucester, in the county of Essex and State of Massachusetts, have invented a certain new and useful Method of and System for Transmitting and Receiving Electroradiant Energy, of which the following is a specification.

Some of the objects of this invention are to provide improved means and an improved method for transmitting electroradiant energy; to provide an improved method of and system for transmitting and receiving electroradiant energy whereby secrecy may be insured in the operation of the system; and to provide other improvements, as will appear hereinafter.

In the accompanying drawings, Figs. 1, 2, 3 and 4 are diagrammatic views of selective electroradiant transmission systems constructed in accordance with this invention; Fig. 5 is a side elevation of a spark gap device forming a part of this invention; Fig. 6 is a fragmentary front elevation of the spark gap device shown in Fig. 5, one half of the device being in vertical central section; Fig. 7 is a fragmentary side elevation of a part shown in Fig. 6; Figs. 8, 9 and 10 are diagrammatic views of electroradiant receiving systems constructed in accordance with this invention; Figs. 11 to 29 inclusive are diagrammatic views showing the manner of operation of the transmitting and receiving systems constructed in accordance with this invention.

Figure 1:
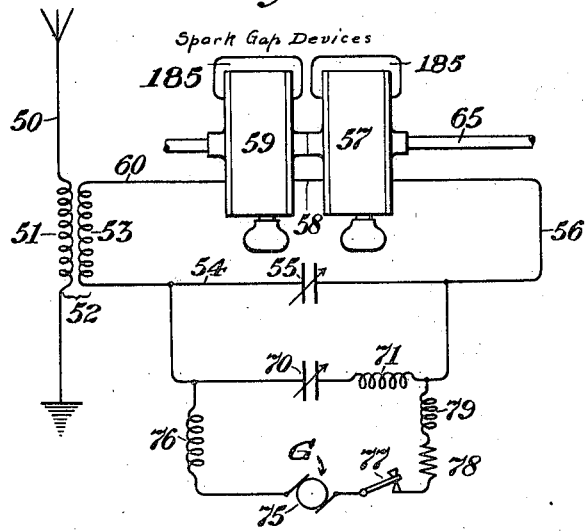

In Fig. 1 is shown a selective system constructed in accordance with this invention for transmitting electroradiant energy having three frequencies from a source of direct current. This system comprises a transmitting antenna or open aerial circuit 50, including a coil 51 which forms the secondary of a transformer 52, the primary coil 53 of which is in an oscillatory circuit including a conductor 54, a variable condenser 55, a conductor 56, a spark gap device 57, a conductor 58, a spark gap device 59 and a conductor 60. A variable condenser 70 is arranged in parallel with the variable condenser 55, and in a tone circuit which includes a choke coil 71. The tone circuit 70, 71 is tuned to the frequency of one of the spark gap devices 57 or 59, preferably the device having the lower frequency. The tone circuit 70, 71, may, however, be omitted without otherwise changing the system.

For supplying energy to the condensers 55 and 70 of Fig. 1, a direct current generator 75 (G) is connected in parallel with the condensers 55 and 70, in a circuit which includes upon one side of the generator a choke coil 76, and upon the other side of the generator a signalling switch 77, a resistance 78 and a choke coil 79.

To control the electrical oscillations in the circuit 53, 55, of Fig. 1, and to cause the same to be divided into a series of regular sets or groups of impulses or quenched spark discharges, the spark gap devices 57 and 59 have rotary elements constructed as hereinafter described, and arranged to be rotated by the shaft 65, the set or group frequency being determined by one of the spark gap devices 57 or 59, for instance, by the gap device 57, and the impulse frequency or frequency of the discharges being determined by the other gap device, for instance, by the gap device 59, as will appear hereinafter. The group frequency determined by the spark gap device 57 is made considerably less than the impulse frequency or frequency of the discharges which is determined by the spark gap device 59, and the impulse frequency determined by the spark gap device 59 is made considerably less than the natural period of oscillation of the open aerial circuit, 50, 51, which provides the third frequency of the system. For instance, the group frequency might be made five hundred per second, the impulse frequency thirty thousand per second and the frequency of the open aerial circuit one million per second.

Figure 2:
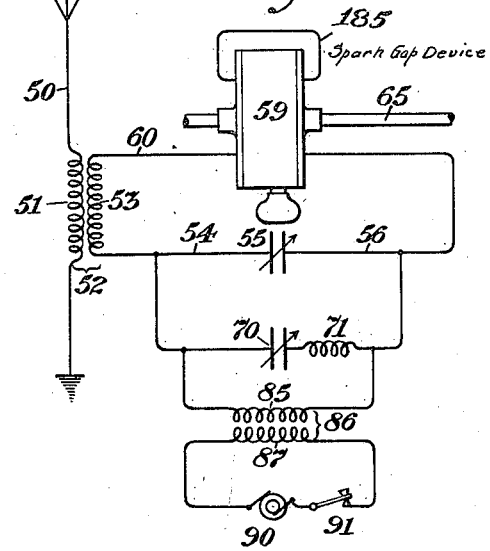

In Fig. 2 is shown a modified selective system constructed in accordance with this invention for transmitting electroradiant energy having three frequencies from a source of alternating current. This system comprises, as hereinbefore described, an antenna 50 having in series therewith a coil 51 which forms the secondary of a transformer 52, the primary coil 53 of which is in an oscillatory circuit including a conductor 54, a variable condenser 55, a conductor 56, a spark gap device 59, and a conductor 60. The spark gap device 59 has a rotary element arranged to be actuated by the shaft 65. A variable condenser 70 is arranged in parallel with the variable condenser 55, and is connected in a tone circuit including an inductance 71. This tone circuit is preferably tuned to the frequency of the gap device 59.

For supplying energy to the condensers 55 and 70 of Fig. 2, a coil 85 is connected in parallel with the condenser 70 and the inductance 71, and forms the secondary of a transformer 86, the primary coil 87 of which is in a circuit which includes a source 90 of alternating current, and a signalling switch 91 for controlling the current. The alternator 90 provides the lowest frequency of the system which may be, for instance, 500 cycles per second, and the spark gap device 59, the rotatable part of which is actuated by the shaft 65, is arranged to divide the oscillations of the circuit 53, 55, into a plurality of impulses or quenched spark discharges, for instance, into thirty thousand impulses or quenched spark discharges per second, which act through the transformer 52 to excite the antenna circuit 50, 51, to produce the third frequency, for instance, of one million per second In Fig. 3 is shown a modified system constructed in accordance with this invention for transmitting electroradiant energy having three frequencies from a source of alternating current. In this system the construction and operation are the same as in the system just described and shown in Fig. 2, except that the tone circuit 70, 71 shown in Fig. 2, and its function, are omitted.

In Fig. 4 is shown a modified system constructed in accordance with this invention for transmitting radiant energy of two frequencies from a source of direct current. This system includes a transmitting antenna 50, having in series therewith a coil 51, which forms the secondary of a transformer 52, the primary coil 53 of which is in an oscillatory circuit, including a conductor 54, a variable condenser 55, a conductor 56, a spark gap device 59 and a conductor 60. The spark gap device 59 has a rotary element arranged to be actuated by the shaft 65, as will appear hereinafter. A variable condenser 70 is connected in parallel with the variable condenser 55 in a tone circuit including an inductance 71. This tone circuit 70, 71, is preferably tuned to the frequency of the spark gap device 59, but may be omitted without otherwise changing the construction of the system.

For supplying energy to the condensers 55 and 70 of Fig. 4, a source of direct current 75 is connected in parallel with the condensers 55 and 70 in a circuit including a choke coil 76 upon one side of a generator 75 and a signalling switch 77, a resistance 78, and a choke coil 79 upon the other side of the generator.

In the modified system shown in Fig. 4, the rotary spark gap device 59 divides the oscillations of the circuit 53, 55, into a plurality of impulses or damped spark discharges having a frequency determined by the spark gap device 59, for instance, a frequency of thirty thousand per second, and these impulses energize the antenna 50 through the action of the transformer 52, and cause the antenna to oscillate in its natural period and to transmit groups of electroradiant oscillations or waves having a predetermined wave frequency, for instance, a frequency of one million per second.

In Figs. 5, 6 and 7 are shown enlarged the details of the spark gap devices 57 and 59, which form parts of the hereinbefore described transmitting systems. This improved spark gap device comprises an approximately cylindrical casing 100, each end of which is provided with a circular opening 101 coaxial therewith, and which is normally closed by a vertical circular cover 102 which fits snugly within the opening 101 and which is clamped detachably in position by means of screws 103 extending loosely through the marginal portion of the cover and threaded into the casing 100. Each cover 102 is provided centrally with a threaded opening 105 which is surrounded by an inwardly projecting approximately cylindrical tubular support 106 integral with the cover 102, and which is provided on its inner end with an inwardly projecting annular flange 107 forming an outwardly facing internal annular shoulder 108 which is arranged in a vertical plane. The inner surface of the tubular support 106 is also provided adjacent the shoulder 108 with a short cylindrical surface 109 coaxial with the tubular support 106. Threaded into the opening 105 is a bushing 115, which may be made of bronze or other suitable bearing material or of any other suitable material, and which is provided with a central cylindrical opening 116 the surface of which is provided with annular oil grooves 117.

Extending horizontally through the casing 100 is a straight shaft 65 of mild steel or any other suitable material, the outer portions of which are reduced in diameter and cylindrically shaped as at 126, and each outer portion 126 fits snugly but rotatably in the corresponding opening 116 of the corresponding bushing 115. Just inside of each reduced portion 126 of the shaft, the shaft is slightly enlarged and threaded as at 127, and from a point spaced inwardly from the threaded portion 127, the shaft 125 is again enlarged to provide an outwardly facing annular shoulder 128. Snugly surrounding the shaft 125 between the shoulder 128 and the threaded portion 127, is a collar 130 made of tempered tool steel or other suitable material, and provided upon its outer surface with an annular raceway 131 in which rest ball bearings 132, the outer surfaces of which engage in a suitable raceway provided in an annular ball retainer 135, which fits snugly within the cylindrical surface 109. The collar 130 is clamped in position against the shoulder 128 by a nut 140 which is threaded upon the threaded portion 127 of the shaft, and which engages loosely in a cylindrical recess 141 provided therefor in the inner end of the bushing 115, a free space being left between the nut 140 and the walls of the recess 141 to permit of the free passage of oil around the ball bearings and into the bearing between the reduced portion 126 of the shaft and the corresponding bushing 115.

For detachably supporting a plurality of spark terminals, the inner portion of the tubular support 106 is reduced exteriorly in diameter so as to provide a cylindrical bearing surface 142 coaxial with the shaft 65, and fitting snugly but rotatably around the cylindrical surface 142 is a substantially cylindrical sleeve 143, the outer end of which is provided with internal lefthand threads 144 which engage over corresponding threads provided therefor on the tubular support 106. The inner end of this sleeve 143 is provided with an outwardly extending flat annular flange 145 integral therewith, and tightly surrounding the sleeve 143 is a flat annular cylindrical insulating drum 146 made of fibre or any other suitable insulating material. The drum 146 is rigidly clamped against the inner surface of the flange 145 by means of screws 147 which extend inwardly through the drum 146 and are threaded through the flange 145.

To provide a suitable outer set of spark terminals, each insulating drum 146 carries two spaced segmental conductors 150 and 151 which are clamped rigidly in position against the inner surface of the drum 146 by means of screws 152 and 153. The screws 152 and 153 extend inwardly through the drum and are threaded into the segmental conductors respectively, a plurality of the screws 152 being threaded into one conductor 150, and a plurality of screws 153 being threaded into the other segmental conductor. These segmental conductors 150 and 151 are arranged coaxially with the shaft 125, and have substantially flat inner surfaces arranged in the same vertical plane, and provided with a plurality of similar and equal and equispaced radial projections 155 integral therewith and which form outer spark terminals the inner surfaces 156 of which are arranged in a plane perpendicular to the longitudinal axis of the shaft 125, and the longitudinal side walls 157 of which are in radial planes which include the longitudinal axis of the shaft 65. The width of the space between successive projections 155 should be greater than the width between the side walls 157 of each projection, and it has been found in practice that good results are given when the space between successive projections 155 measured on any given arc concentric with the segmental conductor is approximately three times the width of each radial projection 155 when measured on the same arc.

Spaced inwardly from each pair of segmental conductors 150 and 151, and arranged to cooperate therewith is an annular conductor 160 made of copper or any other suitable material. Each of the conductors 160 is rigidly secured in any suitable manner to the outer surface of a vertically arranged flat cylindrical insulating drum 161 which fits snugly around a cylindrical sleeve 162. The sleeve 162 is rigidly but removably secured to the central portion of the shaft 65 by means of a screw 163 and is provided with flat annular flanges 164 integral therewith between which the insulating drums 161 are clamped by means of screws 165 extending inwardly through the flanges and threaded into the drums 161. Each annular conductor 160 is provided upon its outer surface with a continuous series of equispaced radial projections 166 which are of the same size as the radial projections 156 on the segmental conductors 150 and 151, and the arrangement is such that when the annular conductor 160 is in a given position of rotation, all of the projections 155 on the two segmental conductors 150 and 151 will register with and be equally spaced from corresponding projections 166 on the adjacent annular conductor 160. The two annular conductors 160 are provided with equal numbers of radial projections 166, and are so arranged that each radial projection of one of the conductors 160 is exactly opposite a corresponding radial projection 166 of the other annular conductor 160, and the segmental conductors 150 and 151 upon one side of the device are arranged so that each radial projection 155 upon each of the segmental conductors 150 and 151 will be at all times exactly opposite corresponding radial projections 155 on the segmental conductors 150 and 151 upon the opposite side of the device.

The two intermediate drums 161 are preferably arranged so that the flat inner surface of one drum will be pressed against the flat inner surface of the other drum, and so that these inner surfaces will be arranged to coincide approximately with a plane, lying perpendicular to the shaft 65, and dividing the spark gap device into two substantially equal and similar halves.

For simultaneously adjusting the widths of the spark gaps, each outer insulating drum 146 is provided with a segmental gear 167, which fits snugly around the cylindrical marginal surface of the drum, and is provided with a flat segmental flange 168 integral therewith which is rigidly clamped against the outer surface of the drum by means of some of the screws 152 which are extended for this purpose.

For rotatably adjusting segmental gears 167, a cylindrical horizontal adjusting shaft 169 is arranged within the casing 100 and above the gear 167. This shaft is formed of insulating material, such for instance, as fibre, and each end of the shaft is provided with an axial cylindrical socket 170 in which snugly fits one end of a short cylindrical shaft 171 which is detachably secured in place by means of a pin 172 extending through the adjusting shaft 169 and the inner end of the short shaft 171. The short shaft 171 extends rotatably through a cylindrical opening 173 provided therefor through the corresponding side wall of the casing 100, and detachably secured to the outer end of each short shaft 173 is a knob 175 whereby the shaft 169 may be rotatably adjusted. Rigidly secured upon the adjusting shaft 169 are two pinions 176 which are arranged to engage the two segmental gears 167 respectively. By turning either of the knobs 175, it is therefore possible to rotate the segmental gears 167 simultaneously in the same direction, and as the inner ends of the sleeves 143 upon which the drums are mounted are oppositely threaded, this simultaneous rotation of the gears 167 in the same direction acts to move the drums 146 and the segmental conductors 150 and 151 carried thereby simultaneously inwardly or outwardly longitudinally of the main shaft 65 dependent upon the direction of rotation of the knobs 175. This movement of the segmental conductors 150 and 151 simultaneously and equally varies the widths of the spark gaps between each annular conductor 160 and the corresponding segmental conductors 150 and 151.

For electrically connecting the segmental conductors 150 and 151 and the annular conductors 160 in series, each cover 102 is provided with two insulators 178, which extend through openings provided therefor in the cover, and each of which is held in place by a nut 179 which is threaded around the insulator upon the inside of the cover. Through each of these insulators 178 extends a conducting rod or terminal 180, the outer end of which is threaded and provided with a clamping nut 181, and the inner end of which is electrically connected by a flexible conductor 182 with a corresponding one of the segmental conductors 150, 151. The outer end of the lower terminal 180 on one side of the device, is connected to one end of an outside conductor, which might be for instance, the conductor 56 of Fig. 1, and the opposite terminal 180 is connected to one end of a conductor, which might be for instance, the conductor 58 of Fig. 1. The outer ends of the two upper terminals 180 are connected together by means of a conductor 185.

To assist in the quenching action of the spark gap device, the interior of the casing 100 is preferably kept filled with an atmosphere rich in hydrogen, such for instance, as pure hydrogen gas or alcohol vapor. In the form of this invention shown, the body portion 100 of the casing is provided upon its underside with a threaded opening 186 into which is threaded the neck 187 of a bowl 188 which is filled with alcohol, and which is provided with a wick 189 which leads upwardly from the bowl, and terminates within the interior of the casing 100. The wick 189 acts to keep the atmosphere of the interior of the casing saturated with alcohol vapor.

In the operation of the improved spark gap device shown in Figs. 5 to 7, the shaft 65 is rotated at any desired constant rate, and as it is rotated the current flows into the device through the conductor 56 and jumps across the gaps between the outer surfaces of the projections 155 of the lower segmental conductor 151, and the outer surfaces of the corresponding projections 166 upon the corresponding annular rotary conductor 160 whenever the projections upon the rotary conductor are approximately opposite the projections on the stationary segmental conductor 151, and the current passes upwardly through the annular conductor 160 and jumps across the gaps between the projections on the annular conductor and projections on the upper segmental conductor 150, and then passes through the conductor 182, upper terminal 180, and conductor 185 across to the opposite upper terminal 180 and into the upper left hand segmental conductor 150 from which at the proper intervals it jumps across the spark gaps to the upper portion of the lefthand rotating annular conductor 161, through which it passes downwardly and then at proper intervals jumps across the gaps to the lower lefthand segmental conductor 151, from which it flows outwardly through the lower lefthand terminal 180 and into the conductor 58.

It is evident from the foregoing description that the frequency of this improved gap device depends upon the number of radial projections 155 and the rate of rotation of the shaft 65, and that the device may be constructed to interrupt the current flowing through the device from the conductor 56 to the conductor 58 at any desired rate. The construction of each of the spark gap devices 57 and 59 shown in Figs. 1 to 4, is the same as that just described, except that the devices 59 and 57 are provided with different numbers of radial projections 155.

For instance, to obtain a frequency of thirty thousand interruptions per second, each annular conductor 160 might be provided with three hundred and sixty radial projections 166 and the shaft 65 would then be rotated about five thousand revolutions per minute, which would give one million eight hundred thousand interruptions per minute or thirty thousand interruptions per second, and to provide five thousand interruptions per second with the shaft 65 rotating at five thousand revolutions per minute, each annular conductor 160 would have to be provided with but sixty radial projections 166.

Any of the systems shown in Figs. 1 to 4 may be operated either by the quenched spark method or by the impact or impulse method. When it is desired to operate by the impulse or impact method, coils 51 and 53 are coupled closely and the spark gaps are adjusted so that the projections 155 of each pair of segmental conductors 150 and 151 are spaced comparatively near the projections 166 of the corresponding annular conductor 160. A looser coupling between the coils 51 and 53 and broader spacing of the spark gaps are used when it is desired to operate by the quenched spark method.

In Fig. 8 is shown a receiving system constructed in accordance with this invention for receiving electroradiant energy of three frequencies from any one of the transmission systems shown in Figs. 1, 2 or 3. This receiving system comprises an antenna 200 having in series therewith a coil 201 which forms the primary of a transformer 202, the secondary coil 203 of which is in an oscillatory circuit which includes a conductor 204 leading from one end of the coil 203 to one side of a stoppage condenser 205, the other side of which is connected by a conductor 206 to the grid 207 of a gaseous detector 208. The stoppage condenser may, however, be omitted and the conductor 204 in that case would be connected directly to the grid 207. The other end of the coil 203 is connected by a conductor 209 to the filament 210 of the detector 208. A variable condenser 211 is connected to the conductors 204 and 209. The circuit through the coil 203 and condenser 211 is tuned to the natural frequency of oscillation of the antenna 200 which is arranged to respond to the wave frequency of the transmission antenna 50. The filament 210 is heated by a battery 212 which acts through a variable resistance 213. The detector 208 includes a plate 215 which is connected by a conductor 216 with one end of a coil 217, the other end of which is connected by a conductor 218 to the positive pole of a battery 219, the other pole of which is connected to the filament 210. A variable condenser 220 is connected to the conductors 216 and 218 and forms with the coil 217 an oscillatory circuit which is tuned to the second or intermediate frequency of the transmission station. The audion 208 acts in a well known manner as an amplifier of the waves of this second frequency. The coil 217 forms the primary of a transformer 225, the secondary coil 226 of which is connected at one end by a conductor 227 to one side of a condenser 228, the other side of which is connected by a conductor 229 with one end of a coil 230, the other end of which is connected by a conductor 231 with the other end of the coil 226. A variable condenser 232 is connected to the conductors 229 and 231, and is in a closed oscillatory circuit which includes the condenser 228 and coil 226 and which is tuned to the second or intermediate frequency of the transmission station. The condenser 232 is also in a closed oscillatory circuit which includes the coil 230 and which is tuned to twice the third or lowest frequency of the waves received from the transmission station.

The coil 230 forms the primary of a transformer 235 of which the secondary coil 236 is connected at one end by a conductor 237 to the grid 238 of a mercury vapor detector 240. The other end of the coil 236 is connected by a conductor 241 with one end of a high resistance 242, the other end of which is connected through a variable resistance 243 to a conductor 244, which leads to the lower terminal 245 of the detector 240. A variable condenser 246 is connected to the conductors 237 and 241, and forms with the coil 236 an oscillatory circuit which is tuned to twice the third or lowest frequency of the received waves. The detector 240 has a top terminal 250 which is connected by a conductor 251 through a slow relay 252 with one terminal of an alternating current generator 255, the other terminal of which is connected by a conductor 256 with the conductor 244, which leads to the lower terminal 245 of the detector. The circuit through the alternator 255 is controlled by the detector 240. The detector includes an annular metal anode 260 which is connected through a choke coil 261 and variable resistance 262 with the positive pole of a battery 263, the negative pole of which is connected to the conductor 244. The battery 263 is also variably connected by a conductor 264 with one end of the variable resistance 243. The slow relay 252 controls a circuit including a battery 265 and a solenoid 266 which is arranged to reciprocate a rack 267 which engages a gear 268 loosely mounted on a rotatable shaft 269. The shaft 269 has rigidly secured thereto a ratchet wheel 270 which is rotated step by step in one direction by a spring pressed pawl 271 which is pivotally secured to the gear 268.

The spindle 269 may be arranged to actuate any suitable device for controlling in any well known or suitable manner the movements of a dirigible body or the operation of one or more devices.

In Fig. 9 is shown a modified receiving system tuned to three frequencies and arranged to receive radiant energy from any one of the transmission systems shown in Figs. 1, 2 and 3. This modified system is the same in construction and operation as the system shown in Fig. 8, and just described, except that in this modified system, instead of the hereinbefore described intermediate circuit 226 to 232, an intermediate circuit is provided which includes a coil 300 which forms the secondary of a transformer 301, which includes the hereinbefore described primary coil 217. The secondary coil 300 is connected at one end to a conductor 302 which is connected to one side of a stoppage condenser 303, the other side of which is connected to a grid 304 of a gaseous detector 305. The other end of the secondary coil 300 is connected by a conductor 306 with the filament 307 of the detector 305. A variable condenser 308 is connected to the conductors 302 and 306, and forms with the coil 300 an oscillatory circuit which is tuned to the second or intermediate frequency of the transmission station. The filament 307 is heated by a battery 309. The detector 305 includes a plate 310 which is connected by a conductor 311 with one end of a coil 312 which forms the primary of a transformer 313 of which the hereinbefore described coil 236 forms the secondary. The other end of the primary coil 312 is connected by a conductor 314 to the positive pole of a battery 315, the other pole of which is connected to the filament 307. A variable condenser 316 is connected to the conductors 311 and 314 and forms with the coil 312 an oscillatory circuit which is tuned to twice the third or lowest frequency of the transmission station. The detector 305 acts in a well known manner to amplify the waves of this lowest frequency.

In Fig. 10 is shown a receiving system for receiving radiant energy of two frequencies, for instance, from the transmission station shown in Fig. 4 or any other suitable station. This modified system is the same in construction and operation as the systems shown in Figs. 8 and 9, except that the intermediate circuits 226 to 232 of Fig. 8 and 300 to 316 of Fig. 9 have been omitted, and the coils 217 and 236 have been inductively connected to form a transformer 325, and the oscillatory circuits 220—217 and 236—246 are tuned to the second or lower frequency of the transmission station. It is thought that the operation of this system will be understood from the foregoing description.

In Figs. 11 to 29 are suggested diagrammatically and approximately some of the oscillatory effects that are thought to be produced in some of the hereinbefore described systems, but it is to be understood that these diagrams are not drawn to any definite scale and that no attempt has been made to have the diagrams represent with any great degree of exactness the oscillations which are produced.

In Figs. 11 and 12 are shown diagrammatically the waves of electroradiant energy of three frequencies, which are transmitted from the sending station shown in Fig. 2, while Figs. 12 to 17 show diagrammatically the wave effects of the same sending station upon the receiving system shown in Fig. 9. In these Figs. 11 to 17, the straight lines 350 indicate the zero lines of current. In Fig. 11 the long curved line 351 indicates the effect of the oscillations of the alternator 90 upon the primary transmitting circuit 53, 55 of Fig. 2 and the short curved lines 352 indicate the effect upon the primary transmitting circuit 53, 55, of the rotary spark gap device 59 of Fig. 2. In the example cited the long waves 351 would have a frequency of 500 cycles per second, while the impulses 352 would have a frequency of 30,000 per second. For clearness, the distance between the consecutive short curved lines 352 is shown much greater in proportion than the distance between the successive points of intersection of the long curved line 351 with the zero line 350, and the same spacing is employed throughout all the diagrams.

Fig. 12 shows in full lines the effect upon the secondary or aerial transmitting circuit 50, 51 of Fig. 2 of the long waves 351 and short impulses 352 of the primary circuit 53, 55. In this Fig. 12, the groups of curved lines 355 indicate the groups of waves of electroradiant energy which are emitted by the aerial circuit 50, 51, In the example noted, these groups would have a group frequency of 30,000 per second and a wave frequency of 1,000,000 per second. It is to be noted that these groups of waves successively increase in amplitude and then decrease in amplitude in accordance with the long waves 351 of Fig. 11, which are shown in the dotted line 351', and inverted in the dotted line 351" of Fig. 12. Fig. 12 also shows the effect upon the aerial receiving circuit 200—201 of Fig. 9 of the oscillations 355 which are emitted from the sending station.

Fig. 13 indicates diagrammatically by the full line 360 the effect upon the audion plate circuit 215 to 219 of Fig. 9 of the groups of waves 355 received by the receiving antenna 200—201, and it is noted that normally an appreciable current is flowing through the plate circuit, and that as the successive groups of waves 355 are received by the antenna 200, the current in the plate circuit 215, 220, 219 is periodically decreased to a degree depending upon and in proportion to the maximum amplitude of the particular group of waves 355 received by the antenna 200 in each instance.

In Fig. 14 is indicated diagrammatically by the full curved line 365, the effect in the oscillatory circuit 220—217 of Fig. 9, of the action of the detector 208. The short waves in the full line 365 correspond in frequency with the frequency of the impulses 352 shown in Fig. 11.

In Fig. 15, the full line 366 shows diagrammatically the oscillations produced in the oscillatory circuit 300, 308 of Fig. 9, the waves in the line 366 being substantially of the same form as those in the line 365 of Fig. 14 but extending upon opposite sides of the zero line 350 as no direct current is added to the varying current in this circuit 300, 308.

In Fig. 16 the full line 367 indicates the current in the plate circuit 310, 316, 315 of the detector 305 of Fig. 9.

In Fig. 17 the full line 368 indicates the current in the oscillatory circuit 312, 316 of Fig. 9. The long waves in this line 368 have twice the frequency of the long waves 351 of Fig. 11 which have the same frequency as that of the alternator 90 of Fig. 2 from which they were derived.

In Fig. 18 the full line 369 indicates the current in the oscillatory circuit 236, 246 of Fig. 9. The oscillations in this current have the same frequency as those shown by the line 368 of Fig. 17 but extend above and below the zero line. These oscillations cause the operation of the detector 240 in a well known manner.

In Figs. 19 to 24 are shown diagrammatically the action of the transmission system and the receiving system when a transmitting system, such for instance, as is shown in Fig. 1, having a triple frequency derived from a source of direct current excitation is used, and a corresponding receiving system, such as is shown in Fig. 9 is used. In these figures, the curved full lines indicating waves are all drawn with respect to zero lines of current 375 respectively.

In Fig. 19 the groups of curved lines 376 indicate the wave action in the primary oscillatory circuit 53, 55, when the system is operated by the quenched spark method, and in Fig. 20, the curved lines 377 indicate the impulses in the primary oscillatory system 53—55, when the system is operated by the impact or impulse method. The group frequency of the spark discharges 376 and the frequency of the impulses 377 are equal and are controlled by and are the same as the frequency of the spark gap device 59, which is higher than the frequency of the other spark gap device 57. For instance, the frequency of the spark gap 59 and, consequently, the group frequency of the spark discharges 376 or impulses 377, as the case may be, may be thirty thousand per second. It is to be noted that the groups 376 and the impulses 377 are divided into sets of groups or impulses, each set being shown in the drawing as having four groups 376 or impulses 377, but in reality each set usually consists of a larger number of groups or impulses. For instance, in the tuning mentioned in Fig. 20 in which the groups 376 or impulses 377 have a group or impulse frequency of 30,000 and a set frequency of 1000, there would probably be approximately 15 groups 376 or impulses 377 in each set. The "set" frequency is determined by the spark gap device 57 used for that purpose.

In Fig. 21 is indicated diagrammatically the effect on the secondary or aerial circuit 50, 51 of the transmission system shown in Fig. 1, and also the effect upon the aerial receiving circuits 200—201 of Figs. 8 and 9, when the impulse method of excitation is used. The groups 378 of full curved lines indicate the groups of electroradiant waves which are transmitted by the open aerial circuit 50, 51, and which are received by the open aerial receiving circuit 200—201. These groups of waves 378 have a wave frequency which is the natural frequency of oscillation of the transmission antenna 50, 51, and of the receiving antenna 200—201 which ordinarily might be taken at one million per second, and the group frequency of the groups of waves 378 would be the same as the group frequency of the spark discharges 376 of Fig. 19, and also the same as the frequency of the impulses 377 of Fig. 20.

When the quenched spark method of excitation is used the oscillations in the antennæ 50 and 200, instead of being in the form shown by the lines 378, would be substantially in the form shown by the line 379 of Fig. 21ª, but the wave frequency, group frequency and set frequency would be the same in both cases.

In Fig. 22 is shown the effect of the waves on the plate circuit 215, 220, 219 of the detector 208 in the receiving system shown in Fig. 9, the current through the plate circuit being indicated by the full curved line 380 which shows that normally an appreciable current flows through the plate circuit, but that each time a group of waves 378 is received by the aerial circuit 200—201, the current in the plate circuit drops nearly to zero and then rises to normal as the received waves fall to zero.

In Fig. 23, the wave oscillation in the tuned circuit 300—308 of Fig. 9 is shown by the full curved line 385 in which the oscillations have a frequency equal to the frequency of the reductions in current of the plate circuit of the detector 208, as shown by the full line 380 of Fig. 22. The oscillations in the circuit 220—217 of Fig. 9 would be the same in form as those indicated by the curved line 335 but would be entirely above the zero line of current.

In Fig. 24, the wave effect in the oscillatory circuit 236—246 of Fig. 9 is shown by the full curved line 390, the wave frequency of which is determined by and is the same as the frequency of the spark gap device 57 of Fig. 1, which is the same as the set frequency of the groups of spark discharges 376 in Fig. 19, and the set frequency of the impulses 377 in Fig. 20.

In Figs. 25 to 29 are shown diagrammatically the effects in the transmission system, and in the receiving system when current having a double frequency is derived from a source of direct current excitation in the transmission system, as shown for instance in Fig. 4, and when a corresponding receiving system such as is shown for instance in Fig. 10 is used. The curved full lines in all of these figures are drawn with respect to straight lines 400 of zero current.

In Fig. 25 the wave effect in the primary oscillatory circuit 53—55 of Fig. 4, when the system is operated by the quenched spark method, is shown by the groups of curved lines 401 representing quenched spark discharges having a group frequency controlled by and the same as the frequency of the spark gap device 59 of Fig. 4, which may be thirty thousand per second.

In Fig. 26 the curved lines 405 show the impulses in the primary circuit 53, 55 of Fig. 4, when the system is operated by the impact or impulse method, the frequency of the impulses 405 being governed by and the same as the frequency of the spark gap device 59.

In Fig. 27 is shown the effect upon the open aerial circuit 50, 51 of the transmission system shown in Fig. 4, and also the effect upon the open aerial circuit 200, 201 of the receiving system shown in Fig. 10, when the impulse method of excitation is used. The groups of waves 410 in these aerial circuits have a group frequency the same as the group frequency of the spark discharges 401, and the same as the frequency of the impulses 405, and have a wave frequency determined by the natural frequency of oscillation of these open aerial circuits, which may be, for instance, one million per second.

In Fig. 28 is shown by the full line 415 the variations in current produced in the plate circuit 215—219 of the audion 208 in the receiving system shown in Fig. 10, and it is to be noted in this figure that normally an appreciable current flows through the plate circuit of the audion 208, and this current is reduced each time a group of waves 410 is received by the aerial circuit 200—201.

In Fig. 29 is shown the effect in the oscillatory circuit 236—246 of the receiving system shown in Fig. 10. The circuits 220—217 and 236—246 are tuned to the group frequency of the waves 410 of Fig. 27, and the oscillations in the circuit 236—246 indicated by the curved line 420 of Fig. 29 consequently have a corresponding frequency. The oscillations in the circuit 220—217 would be substantially the same in form as those indicated by the curved line 420 but would be entirely upon the upper side of the zero line.

In any of the hereinbefore described receiving systems (see Figs. 8, 9 and 10) normally no appreciable current flows through the detector 240 from the source of alternating current 255 in the circuit controlled by the detector, but whenever the controlling oscillatory circuit 236—246 of the detector 240 is energized, as hereinbefore described, the detector 240 operates in a well known manner to permit a unidirectional current to flow through the detector and through the controlled circuit from the source 255, thus energizing the slow relay 252 as long as the controlling circuit 236—246 is energized. Whenever current is thus permitted to flow through the slow relay 252 for a sufficient period, the relay acts to close the circuit through battery 265 and the solenoid 266, and thus reciprocates the rack 267 which acts to rotate the ratchet 270 of the shaft 269 through one step, and to effect a corresponding control of the dirigible body or of any other device that may be controlled by the shaft 269.

While this invention has been described as applied to triple frequency systems having a high frequency, for instance, of 1,000,000 per second, an intermediate frequency, for instance, of 30,000 per second, and a low frequency, for instance, of 500 per second, it is to be understood that this invention is not limited to the use of any particular frequency, or group of frequencies, in any case, but preferably when three frequencies are used they are so selected that the intermediate frequency will be above the upper limit of audibility and too high to be interfered with by oscillations of audible frequency, or by the harmonics produced by the spark gap discharges, and too low to be forced by any high frequency interference, such for instance, as by a high frequency of 1,000,000 per second. An intermediate frequency of 30,000 per second is considered for all practical purposes to be above the upper limit of audibility, as determined by the ordinary operator, but it is to be understood that instead of an intermediate frequency of 30,000 per second, a higher intermediate frequency may be substituted, if it should be considered advisable, for instance, an intermediate frequency of 40,000 or 50,000 per second, without changing either of the other frequencies.

While only a few of the forms have been shown in which the invention may be embodied, it is to be understood that the invention is not limited to any particular device or system, but might be applied in various devices and systems without departing from the spirit of the invention or the scope of the appended claims.

Having thus fully described this invention, I claim, and desire to protect by Letters Patent of the United States:

1. In a selective system for the transmission of electroradiant energy, the combination with transmission means arranged to emit a series of sets of groups of electroradiant oscillations of a predetermined high frequency, the maximum amplitude of the oscillations in each set being increased successively in a predetermined manner during the first half of each set, and then decreased successively in a corresponding manner during the second half of each set, of receiving means arranged to selectively receive said oscillations and to function through the conjoint action of said oscillations, said groups and said sets of groups.

2. In a selective system for the transmission of electroradiant energy, the combination with transmission means arranged to emit a series of sets of groups of electroradiant oscillations of a predetermined high frequency, the maximum amplitude of the oscillations in each set being increased successively in a predetermined manner during the first half of each set and then decreased successively in a corresponding manner during the second half of each set, of receiving means arranged to selectively receive said oscillations and to function through the conjoint and successive action of said oscillations, said groups and said sets of groups.

3. Means for transmitting electroradiant energy, including a source of energy, an oscillatory circuit arranged to be supplied with energy from said source, frequency controlling means including a plurality of spark gap devices having a plurality of movable elements arranged to interrupt said circuit and to divide the oscillations therein into a plurality of sets of impulses having a set frequency determined by one of said elements, and an impulse frequency determined by another of said elements, and a circuit associated with said first mentioned circuit and arranged to be energized thereby and to emit sets of groups of electroradiant oscillations having a predetermined high wave frequency, a group frequency determined by said impulse frequency and a set frequency determined by said first mentioned set frequency.

4. Means for transmitting electroradiant energy, including a source of energy, an oscillatory circuit arranged to be supplied with energy from said source, frequency controlling means including a plurality of spark gap devices having a plurality of rotatable elements arranged to interrupt said circuit and to divide the oscillations therein into a plurality of sets of impulses having a set frequency determined by one of said elements, and an impulse frequency determined by another of said elements, and a circuit associated with said first mentioned circuit and arranged to be energized thereby, and to emit sets of groups of electroradiant oscillations having a predetermined high wave frequency, a group frequency determined by said impulse frequency and a set frequency determined by said first mentioned set frequency.

5. A system for the transmission of radiant energy, comprising means for emitting high frequency radiant oscillations and for impressing upon said oscillations sets of periodic variations having a predetermined variation frequency and a predetermined set frequency, of receiving means including cooperating circuits tuned respectively to the wave frequency, the variations frequency and to approximately twice the set frequency of said oscillations.

6. A system for transmitting and receiving radiant energy, comprising means for transmitting radiant energy in such a form as to include two series of periodic impulses having two different predetermined frequencies respectively, two receiving elements tuned to respond to said frequencies respectively, a third receiving element tuned to respond to a frequency different from either of said first-mentioned frequencies and arranged to be controlled as a result of the cooperative and successive action of said first-mentioned elements, and a vacuum tube rectifier interposed between two of said elements.

7. A system for transmitting and receiving radiant energy, comprising means for transmitting radiant energy in such a form as to include two series of periodic impulses having two different predetermined frequencies respectively, two receiving elements tuned to respond to said frequencies respectively, a third receiving element tuned to respond to a frequency different from either of said first-mentioned frequencies and arranged to be controlled as a result of the cooperative and successive action of said first-mentioned elements, said two first-mentioned elements being in the form of electrically tuned oscillatory circuits, and vacuum tube rectifiers interposed between said elements.

8. A system for transmitting and receiving radiant energy, comprising means for transmitting radiant energy in such a form as to include two series of periodic impulses having two different predetermined frequencies respectively, two receiving elements tuned to respond to said frequencies respectively, a third receiving element tuned to respond to a frequency different from either of said first-mentioned frequencies and arranged to be controlled as a result of the cooperative and successive action of said first-mentioned elements, each of said elements being in the form of an electrically tuned oscillatory circuit, and vacuum tube rectifiers interposed between said elements.

9. A system for transmitting and receiving radiant energy, comprising means for emitting a series of radiant impulses having a frequency substantially above audibility, and means for impressing upon said impulses a series of periodic variations having a frequency different from the said first mentioned frequency and substantially above audibility, in combination with means for receiving said impulses and variations including two elements tuned to respond selectively to said impulses and variations respectively, a vacuum tube rectifier interposed between said elements, and a receiving device arranged to be controlled by the conjoint action of said elements.

10. A system for transmitting and receiving radiant energy, comprising means for emitting a series of radiant impulses having a frequency substantially above audibility, and means for impressing upon said impulses a series of periodic variations having a frequency different from the said first mentioned frequency and substantially above audibility, in combination with means for receiving said impulses and variations including two elements tuned to respond selectively to said impulses and variations respectively, a vacuum tube rectifier interposed between said elements, and a receiving device arranged to be controlled by the conjoint and successive action of said elements.

11. In a signalling system, the combination with means for transmitting energy in a series of groups of waves having a predetermined wave frequency and a predetermined group frequency, both of said frequencies being substantially outside the range of audibility, and there being no fixed phase relation between the waves of one group and the waves of another group, of receiving means operatively associated with the said means for transmitting energy, including primary receiving means responsive to said energy, secondary receiving means tuned to respond selectively to impulses of said group frequency, and a receiving device controlled by the conjoint action of said primary and secondary receiving means.

12. A method of transmitting and receiving energy, which consists in generating a series of groups of waves having a group frequency substantially above audibility, and there being no fixed phase relation between the waves of one group and the waves of another group, receiving some of the energy of said groups of waves and detecting the same and thereby producing pulsations having a frequency determined by said group frequency, and causing said pulsations to control a receiving device.

13. The method of transmitting and receiving energy, which consists in generating waves in groups varied at a frequency different from the wave frequency and from the group frequency, the waves of one group having no fixed phase relation with the waves of another group, receiving some of the effect of said groups of waves, demodulating the same and thereby producing impulses having a frequency corresponding with the frequency of said groups, and demodulating said impulses and thereby producing impulses having a frequency corresponding to the said first-mentioned frequency.

14. A transmission system for producing impulses including a source of direct current, and a plurality of rotary spark gap devices in series with said source.

15. A transmission system for producing impulses including a source of direct current, and a plurality of rotary spark gap devices of different frequencies respectively in series with said source.

16. A transmission system for producing impulses including a source of electric current, a plurality of rotary spark gap devices in series with said source, and a condenser in series with said source and with said devices.

17. A transmission system for producing impulses including a source of electric current, a plurality of rotary spark gap devices of different frequencies respectively in series with said source, and a condenser in series with said source and with said devices.

18. A transmission system for producing impulses including a source of electric current, a plurality of rotary spark gap devices of different frequencies respectively in series with said source, a condenser in series with said source and with said devices, and a tone circuit including a condenser and an inductance in series with said devices and tuned to the frequency of one of said devices.

19. A transmission system for producing impulses including a source of electric current, a plurality of rotary spark gap devices of different frequencies respectively in series with said source, and a condenser in series with said source and with said devices, in combination with a receiving system including a circuit responsive to impulses produced by said transmission system, a detector controlled by said circuit, a circuit controlled by said detector and tuned to respond selectively to impulses produced by the action of said detector as a result of the action of one of said spark gap devices, a detector controlled by said last-mentioned circuit and a circuit controlled by said last-mentioned detector and tuned to respond selectively to impulses produced by said last-mentioned detector as a result of the action of the other one of said rotary spark gap devices.

20. A system in accordance with claim 19 and in which each of said detectors acts as a demodulator.

21. A system in accordance with claim 19 and in which each of said detectors acts as a rectifier.

22. A transmission system for producing electrical impulses including a rotary spark gap device, and means including a rotary spark gap device arranged to supply to said first-mentioned device electric impulses having an impulse frequency determined by said second-mentioned device and different from the frequency of said first-mentioned spark gap device.

23. A transmission system for producing electric impulses including a rotary spark gap device and means operatively connected to said device for supplying the same with electric energy including a plurality of condensers and a source of electric energy.

24. A transmission system for producing electric impulses including a rotary spark gap device, and means operatively connected to said device for supplying the same with electric energy including a plurality of condensers, an inductance in series with one of said condensers and forming therewith a tone circuit tuned to the frequency of said gap device, and a source of electric current.

25. A transmission system for producing electric impulses including a plurality of rotary spark gap devices of different frequencies respectively, a shaft upon which all of said devices are mounted, a circuit including said devices, an inductance and a condenser, a tone circuit including a condenser and an inductance in shunt with said first-mentioned condenser and tuned to the frequency of one of said gap devices, and a source of electric energy in shunt with said tone circuit.

26. In a selective system for the transmission of electroradiant energy, the combination with transmission means arranged to emit a series of sets of groups of electroradiant oscillations of a predetermined high frequency, the maximum amplitude of the oscillations in each set being increased successively in a predetermined manner during the first half of each set, and then decreased successively in a corresponding manner during the second half of each set, of receiving means arranged to selectively receive said oscillations, said groups and said sets of groups and to function through the conjoint action of said oscillations, said groups and said sets of groups.

27. A transmission system for producing impulses including a circuit containing a source of electric current, a second circuit containing a plurality of rotary spark gap devices, and a condenser in common with said circuits.

28. A transmission system for producing impulses including a circuit containing a source of electric current, a second circuit containing a plurality of rotary spark gap devices of different frequencies respectively, and a condenser in common with said circuits.

29. A transmission system for producing impulses including an oscillatory circuit, a plurality of rotary spark gap devices in said circuit, and a source of electric current for energizing said oscillatory circuit.

30. A transmission system for producing impulses including an oscillatory circuit, a rotary spark gap device in said circuit, a tone circuit including a condenser and an inductance connected in shunt with a portion of said first-mentioned circuit and tuned to the frequency of said spark gap device, and a source of electrical energy connected across the terminals of said tone circuit.

31. A transmission system for producing impulses including an oscillatory circuit, a rotary spark gap device in said circuit, a condenser also in said circuit, a tone circuit including a condenser and an inductance connected in shunt with said first-mentioned condenser and tuned to the frequency of said spark gap device, and a source of electrical energy connected across the terminals of said tone circuit.

32. A carrier wave transmission system comprising means for producing a series of radio frequency impulses having simultaneously existent therein a plurality of series of variations of higher and lower frequencies respectively, said series of variations of lower frequency being within the range of audibility, a receiving circuit tuned to the frequency of said impulses and a second circuit tuned to said higher variation frequency, a vacuum tube rectifier interposed between said circuits, a second vacuum tube rectifier controlled by said second circuit, and an indicator circuit controlled by said second rectifier.

Signed at Gloucester, in the county of Essex and State of Massachusetts, this 13th day of September, A. D. 1916.

JOHN HAYS HAMMOND JR.